United States Patent [19]

Klassen

[11] Patent Number: 5,742,300
[45] Date of Patent: Apr. 21, 1998

[54] RESOLUTION ENHANCEMENT AND THINNING METHOD FOR PRINTING PIXEL IMAGES

[75] Inventor: R. Victor Klassen, Webster, N.Y.

[73] Assignee: Xerox Corporation, Stamford, Conn.

[21] Appl. No.: 368,139

[22] Filed: Jan. 3, 1995

[51] Int. Cl.⁶ .................. B41J 29/38; B41J 2/05
[52] U.S. Cl. .................. 347/9; 347/15; 347/131; 358/296
[58] Field of Search .................. 347/9, 15, 37, 347/41, 131, 188, 240; 358/296, 298, 451; 395/102

[56] References Cited

U.S. PATENT DOCUMENTS

| | | | |
|---|---|---|---|
| 4,437,122 | 3/1984 | Walsh et al. | 347/5 |
| 4,629,342 | 12/1986 | Futaki | 101/93.04 |
| 4,774,530 | 9/1988 | Hawkins | 347/63 |
| 4,967,203 | 10/1990 | Doan et al. | 347/9 |
| 5,029,108 | 7/1991 | Lung | 395/109 |
| 5,270,728 | 12/1993 | Lund et al. | 347/5 |
| 5,353,387 | 10/1994 | Petschik et al. | 395/109 |
| 5,359,355 | 10/1994 | Nagoshi et al. | 347/41 |
| 5,374,943 | 12/1994 | Lehmann et al. | 382/258 |
| 5,469,198 | 11/1995 | Kadonaga | 347/41 |

FOREIGN PATENT DOCUMENTS

A-0-513 989  11/1992  European Pat. Off. .
WO-A-92/04191  3/1992  WIPO .

Primary Examiner—Mark J. Reinhart
Assistant Examiner—Craig A. Hallacher
Attorney, Agent, or Firm—Oliff & Berridge

[57] ABSTRACT

To print an image having a 300 x 600 dpi effective resolution with an ink jet printer that has a 300 dpi resolution, the method increases a resolution or density of the pixel image along the raster scan axis. The pixel image is thinned and raster scanned with the ink jet printer to visibly reproduce the pixel image at the 300 x 600 dpi resolution. The pixel image may be thinned based on a checkerboard pattern while maintaining and enhancing edges.

29 Claims, 9 Drawing Sheets

RESOLUTION ENHANCEMENT AND THINNING METHOD FOR PRINTING PIXEL IMAGES

BACKGROUND OF THE INVENTION

1. Field of the Invention

This invention relates to ink jet printers and more particularly, to a method of achieving efficiency by utilizing resolution enhancement with pixel deletion.

2. Description of Related Art

An ink jet printhead selectively ejects droplets of ink from a plurality of drop ejectors to create a desired image on an image receiving medium, such as paper. The printhead typically comprises an array of drop ejectors that convey ink to the image receiving medium. In a carriage-type ink jet printhead, the printhead moves back and forth relative to the image receiving medium to print the images in swaths.

The ink jet printhead typically comprises a plurality of ink passageways, such as capillary channels. Each channel has a nozzle end and is connected to an ink supply manifold. Ink from the manifold is retained within each channel, until in response to an appropriate signal applied to a resistive element in that channel, the ink in a portion of the channel adjacent to the heating element is rapidly heated and vaporized. Rapid vaporization of some of the ink from the channel creates a bubble that causes a quantity of ink (i.e., an ink droplet) to be ejected through the nozzle to the image receiving medium. U.S. Pat. No. 4,774,530 to Hawkins, the disclosure of which is incorporated herein by reference, shows a general configuration of a typical ink jet printer.

Many commercially available ink jet printers have a 300 dots per inch (dpi) resolution along the horizontal axis (also called the raster scan axis) and a 300 dpi vertical resolution so as to form round individual ink droplets that form the pixel images on the paper. These inkjet printers are therefore designed to print 300×300 dpi output images. However, increased resolution is desired to print higher resolution images and thus visually pleasing images. For example, it may be desirable to print a pixel image at a 300×600 dpi effective resolution using a 300 dpi ink jet printhead. This resulting image would therefore appear to be printed with a higher resolution.

U.S. Pat. No. 5,270,728 to Lund et al., the disclosure of which is incorporated herein by reference, discloses a method of multiplying the speed resolution of a raster scanning device such as an ink jet printer. A 300×600 dpi pixel image is mapped to a corresponding, nonoverlapping physical dot image and the ink jets are fired in response to the dot image to direct ink droplets onto the printer at a 600 dpi resolution grid timing to effectively double the horizontal resolution of the pixel image.

U.S. Pat. No. 5,270,728 describes thinning the pixel image before it is printed by selectively turning off pixels within the pixel image by referencing the edges of the pixel image. More specifically, U.S. Pat. No. 5,270,728 describes a method of maintaining selected ones of the pixels in an ON state based on the ON pixel adjacency and edge proximity criteria. In U.S. Pat. No. 5,270,728, the pixel image that is initially received is a 300×600 dpi image. The described method thins the pixel image so as to print at the resolution of the printhead.

However, it may also be desirable to increase the resolution of a 300×300 dpi pixel image to have the visible appearance of a higher resolution. Particularly, it may be desirable to print the pixel image at a 300×600 dpi effective resolution. This results in enhancing the curves on edges of the image.

U.S. Pat. No. 5,029,108 to Lung, the disclosure of which is incorporated herein by reference, teaches a method of enhancing edge representations when an image is converted from graphical format to print format. Edges are modified by repositioning related dots or by altering the dot size. A TBAP (To Be Adjusted Pixel) located on an edge is modified to enhance the smoothness of a segment transition. Gradient mask matrices are used to determine whether a change of brightness occurs.

U.S. Pat. No. 4,437,122 to Walsh et al., the disclosure of which is incorporated herein by reference, teaches a method of enhancing the resolution and quality of characters. A pixel pattern is formed including a center pixel and neighboring pixels. The pixel pattern is compared with standard pixel patterns and the center pixel is altered or not based on the standard pixel pattern that the current pixel pattern matches.

It has also been a problem that prior art resolution enhancement methods print excessive amounts of ink on the copy sheet which causes the ink to run and distort the image. Furthermore, the ink jet must have the ability to generate drops at such a high frequency when a grid timing of the pixel is altered.

SUMMARY OF THE INVENTION

To solve these and other problems, this invention provides a method of resolution enhancement and thinning by altering a 300×300 dpi image to visually appear as a 300×600 dpi pixel image on the image receiving medium. Other resolutions such as 400 and 800 dpi are also within the scope of this invention.

This invention provides a method for printing a pixel image using an ink jet printer having a defined resolution along a raster scan axis. The pixel image is received having the defined resolution. A resolution (or density) of the pixel image is increased along the raster scan axis. The pixel image is then thinned and subsequently the thinned pixel image is raster scanned with the ink jet printer to visibly reproduce the pixel image at the increased resolution.

The pixel image is preferably thinned using a checkerboard pattern for all interior pixels while maintaining edge pixels.

Other objects, advantages and salient features of the invention will become apparent from the detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

Figure 1:
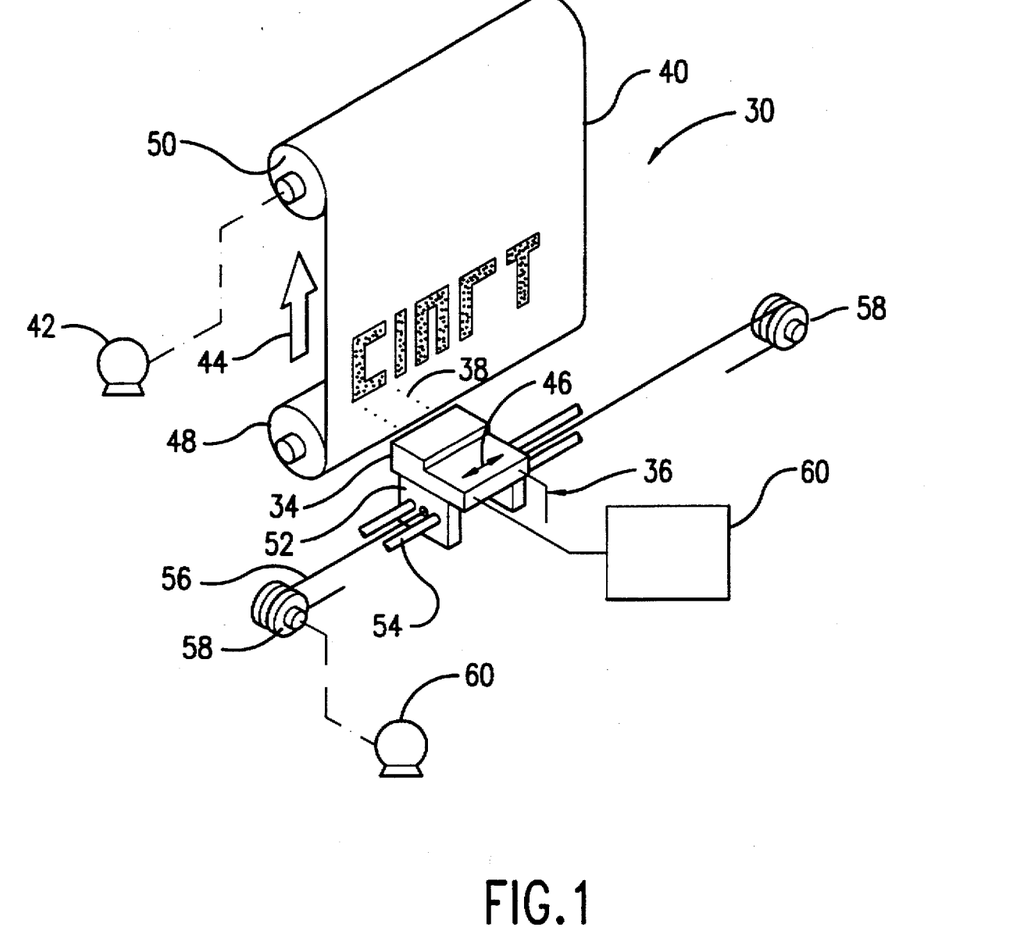
FIG. 1 is a schematic view of an inkjet printing system.

FIG. 1 shows a carriage-type ink jet printing device 30. A linear array of droplet-producing channels is housed in the printhead 34 of a reciprocating carriage assembly 36. Ink droplets 38 are propelled to a receiving medium 40 that is stepped by a motor 42 a preselected distance in the direction of arrow 44 each time the printhead 34 traverses across the receiving medium 40 in the direction indicated by arrows 46. The receiving medium 40, such as paper, can be stored on a supply roll 48 and stacked onto a takeup roll 50 by the motor 42 or other means well known in the art.

The printhead 34 is fixedly mounted on a support base 52, which is adapted for reciprocal movement using any well known means such as the two parallel guide rails 54. The reciprocal movement of the printhead 34 may be achieved by a cable 56 and a pair of rotatable pulleys 58, one of which is powered by a reversible motor 60. The printhead 34 is generally moved across the receiving medium 40 perpendicular to the direction the receiving medium is moved by the motor 42. Of course, other structures of reciprocating the carriage assembly 36 are also known within the art.

The printhead 34 may be connected to a controller 60 that will be used with embodiments of the present invention to receive a pixel image and perform resolution enhancement and thinning on the pixel image prior to or simultaneously with printing the pixel image. The controller 60 may include hardware or software to carry out the present invention as will be described below. Further, it is understood that the above description of the ink jet printing device 30 is merely illustrative and is not limiting. That is, other structures are also within the scope of this invention.

The present invention will be described with respect to receiving a 300×300 dpi pixel image and subsequently altering the pixel image to output an image with a visual appearance of a 300×600 dpi resolution. The printhead 34 is preferably adapted to print ink drops at a 300 dpi resolution. Therefore, the method described below preferably gives the appearance that a 300 dpi printhead is printing at a 300×600 dpi effective resolution. However, the resolutions discussed herein are merely illustrative and are not intended to be limiting. That is, other resolutions are also within the scope of this invention.

Figure 2:
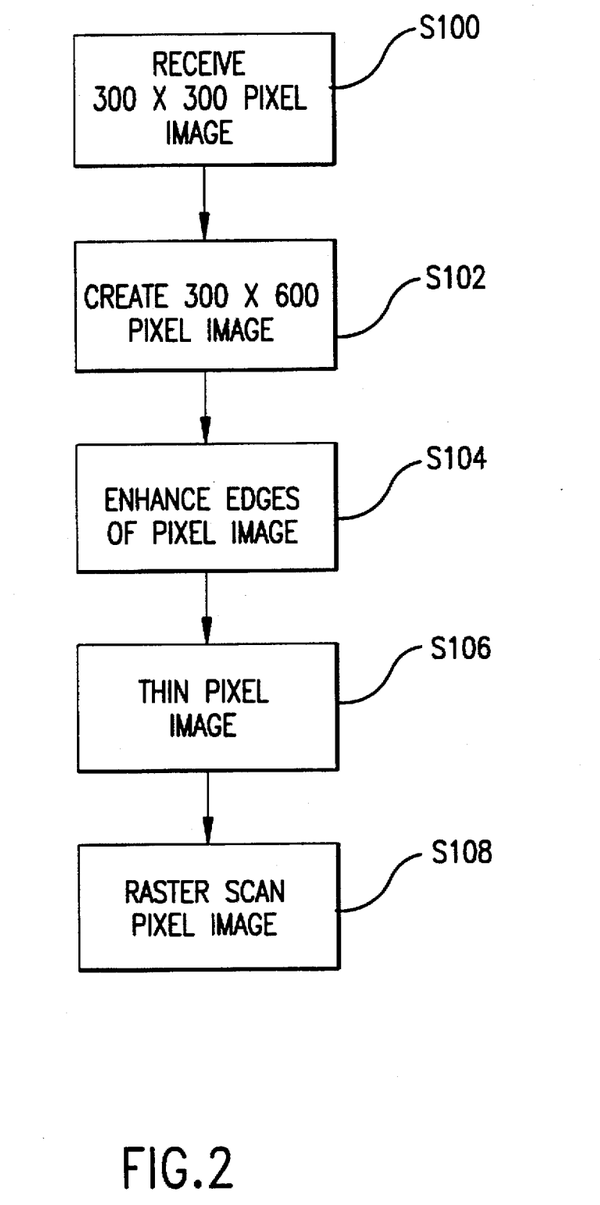
FIG. 2 is a flowchart showing a method of the present invention.
Figure 3A:
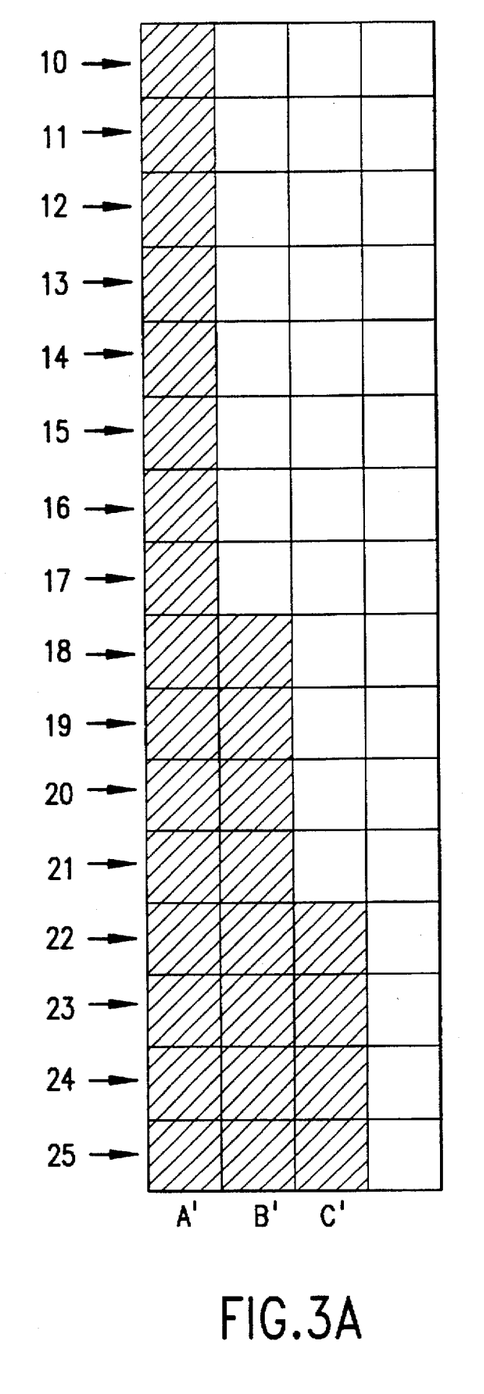
FIG. 3A shows a 300×300 dpi pixel image.

FIG. 2 shows a flowchart describing an embodiment of the present invention that will be described with respect to FIGS. 3A–3D. In step 100, a 300×300 dpi pixel image is received within the controller 60. The image may be created from a scanning device, a ROS, a computer or other similar device. For example, FIG. 3A shows a pixel image having ON pixels represented by shaded boxes and OFF pixels represented by unshaded boxes. In FIG. 3A, each pixel is represented by a corresponding box (or rectangle) having a 300 dpi vertical and horizontal resolution. For ease of illustration, each row is consecutively numbered as one of the pixel rows 10–25. Each of the columns is labelled with a corresponding letter A', B' and C'. The columns are consecutively labelled across the raster scanning axis while the rows are consecutively labelled in the slow scan (or vertical) direction. As an example, the pixel in the upper left hand corner is labelled as pixel 10A'. Similarly, the ON pixel in the bottom right hand corner of the image is labelled as pixel 25C'.

Figure 3B:
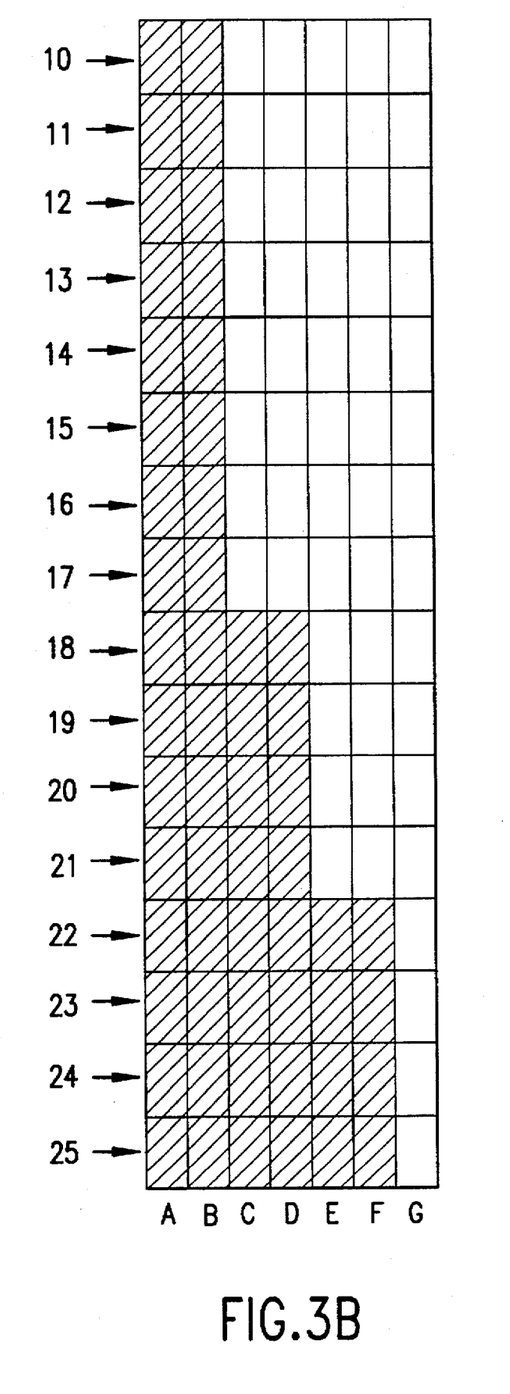
FIG. 3B shows a 300×600 dpi pixel image.

In step 102, a 300×600 dpi pixel image is created from the 300×300 dpi pixel image (shown in FIG. 3A). For example, each 300 dpi pixel from FIG. 3A is converted into two 300×600 dpi pixels as shown in FIG. 3B. For example, pixel 10A' is converted into pixels 10A and 10B while pixel 25C' is converted into pixels 25E and 25F. In essence, this doubles the number of pixels within the pixel image. Thus, step 102 effectively doubles the resolution or density of pixels within the image. It is understood that step 102 is not limited to doubling the resolution but rather any increase in the resolution or density is within the scope of this invention.

In step 104, edge regions of the pixel image are enhanced to improve the visual quality of the edge regions and to take advantage of the visual qualities of the increased resolution. Edge enhancement typically occurs along edge regions when adjacent pixel rows differ from one another along the edges. One effect of edge enhancement is to smooth the edges to avoid jagged edges or staircase edges that occur when using lower resolutions.

In FIG. 3B, the pixel rows 17 and 18 differ from each other along the edge of the image while the pixels rows 21 and 22 differ from each other along the edge of the image. This may cause a jagged or staircase image if printed using the pixel image in FIG. 3B. The present invention preferably alters pixel rows along the edges so as to better conform with a 300×600 dpi image and thus remove the jagged edges. For example, rows 10–17 each correspond to a black, black, white, white pattern (hereafter a BBWW pattern) along the edge of the image. Row 18 shows a black, black, black, black pattern (a BBBB pattern) for the same columns along the edge of the image.

Figure 3C:
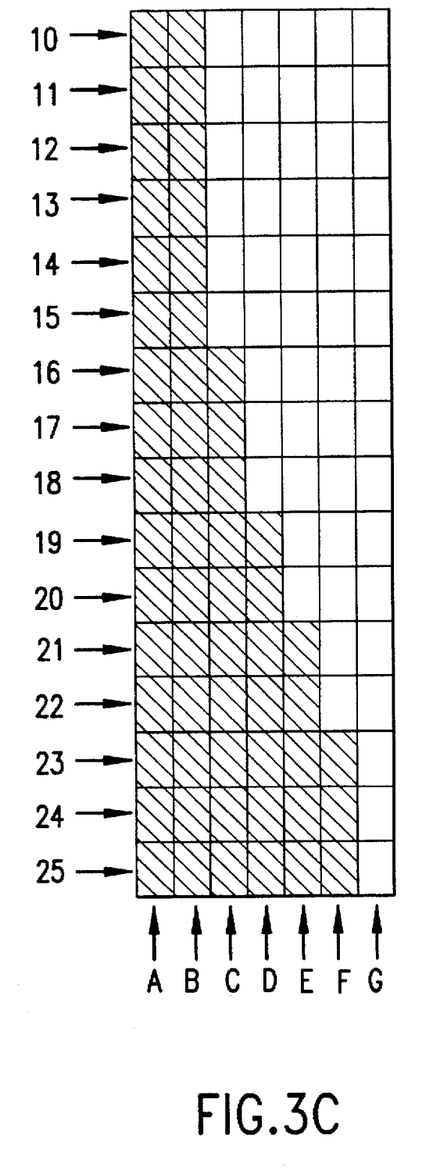
FIG. 3C shows edge enhancement of the 300×600 dpi pixel image according to an embodiment of the present invention.

A toggling algorithm may be used to alter pixels along the edges when adjacent pixel rows differ from each other. In one method, when a transition occurs between a pattern of pixel rows (such as between rows 10–17 and row 18), the number of bits to toggle is one quarter of the number of identical rows that are different from the current row. That is, a first row is considered to be identical to a second row if all of the pixels in a small window under consideration in the first row are identical to the corresponding pixels in the window at the same location on the second row. Preferably, only a maximum of four bits may be toggled in a respective column. For example, rows 10–17 of FIG. 3B represent eight pixel rows that are different from pixel row 18. Because the pattern differs beginning in column C of row 18, only two bits will be toggled in column C based on rows 10–17. These toggled bits correspond to ON pixels 16C and 17C in FIG. 3C. Column D is also examined to turn OFF pixels based on the repetitive BBBW pattern among rows 18–21 and columns B–E. Because the four rows 18–21 are similar in a downward direction, only one bit (18D) will be turned OFF in column D of FIG. 3C. FIG. 3C therefore shows the result of toggling ON pixels 16C and 17C while turning OFF pixel 18D.

Toggling also may occur in columns E and F because of the difference between pixel rows 19–21 and 22–25. For example, pixel rows 19, 20 and 21 have a black pixel in column D and a white pixel in column E (i.e., a BBWW pattern). Because these three rows differ from row 22, one bit (21E) will be toggled ON in FIG. 3C. Furthermore, rows 22,23,24 and 25 each have an ON pixel in column F. Therefore, one bit (22F) will be turned OFF in column F.

In summary, the toggling operation is performed by examining rows above and below a current row. Toggling is effected based on the number of identical rows that are different from the transition row. The number of rows that are different is divided by four to equal the number of pixels to be toggled. This number may be rounded up for pixel rows above a current row but truncated for pixel rows below the transition row. That is, when examining rows above the transition row, any quotient greater than one half following the division by four indicates another bit to be toggled ON whereas when examining rows below the transition row any quotient after the division by four is ignored for pixels to be turned OFF.

As can be seen by FIG. 3C, the edge definition of the pixel image is altered to have a 600 dpi effective resolution. Therefore, the edges of the image are much smoother than the original 300 dpi pixel image of FIG. 3A. The above toggling description used to enhance the edges is merely illustrative and is not limiting. That is, many different methods of altering the edge regions are also within the scope of this invention.

Figure 3D:
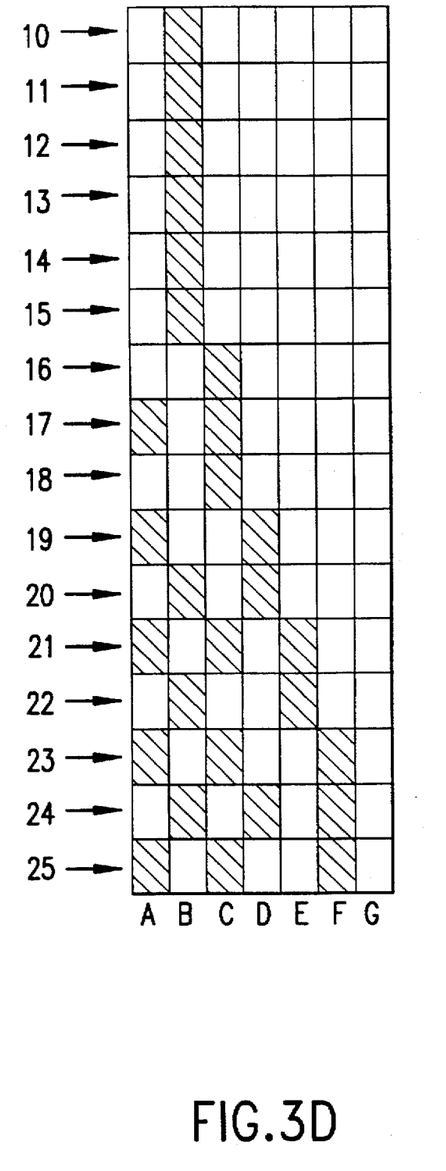
FIG. 3D shows a thinned pixel image according to an embodiment of the present invention.

In step 106 of FIG. 2, the toggled pixel image having the increased resolution (or density) is thinned to create a thinned pixel image such as that in FIG. 3D. This thinning operation can be achieved in many different manners. Preferably, the edge pixels are maintained on so as to clearly define the edge region. That is, pixels 10B, 11B, 12B, 13B, 14B, 15B, 16C, 17C, 18C, 19D, 20D, 21E, 22E, 23F, 24F, and 25F are all maintained ON in the thinned image. Other pixels within the interior of the pixel image are thinned using one of several methods. For example, the interior region of the pixel image shown in FIG. 3D is thinned based on an underlying checkerboard pattern that results in interior pixels being maintained ON so that ON interior pixels are diagonal to other ON interior pixels and OFF interior pixels are diagonal to other OFF interior pixels. This helps avoid visual defects caused by the vertical orientation of ON pixels within the interior region. Thinning greatly improves the overall quality of the pixel image because it helps avoid printing with excessive ink on the print sheet. Thus, the thinning step 106 helps improve the visual quality of the resulting printed image.

Figure 5:
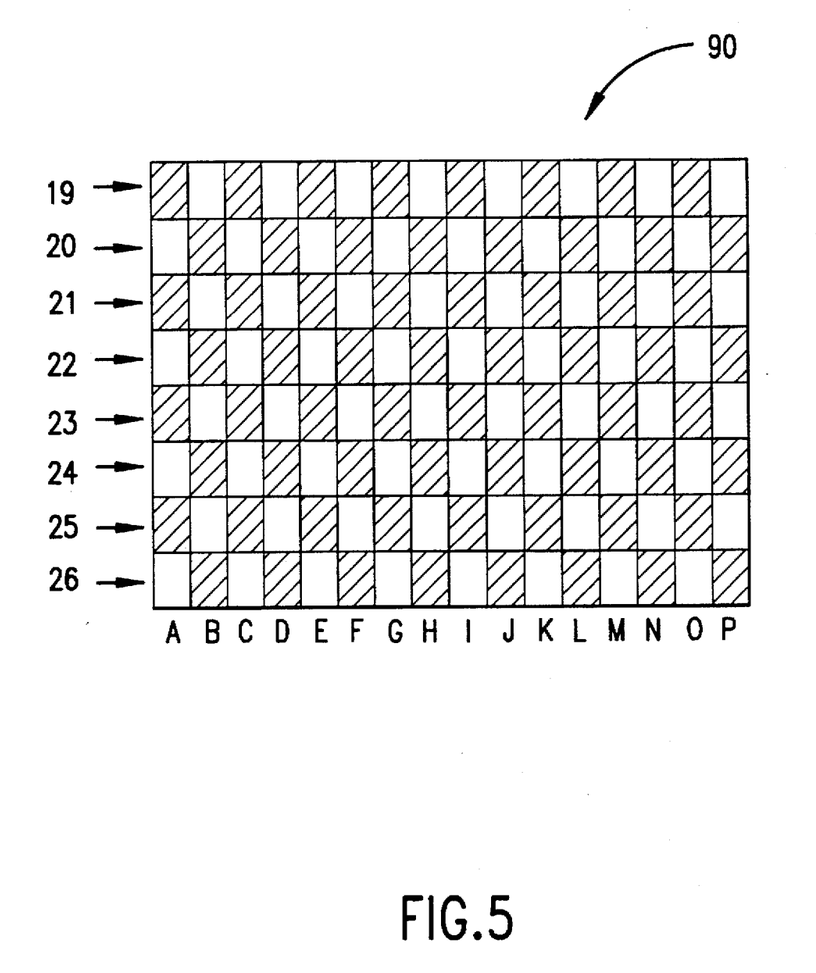
FIG. 5 shows a checkerboard pattern used with embodiments of the present invention.

An exemplary checkerboard pattern 90 is shown in FIG. 5 to represent an ON/OFF/ON/OFF pattern for odd numbered rows 19, 21, 23 and 25 and an OFF/ON/OFF/ON pattern for even numbered rows 20, 22, 24 and 26. This underlying checkerboard pattern 90 (or mask) is preferably the size of a swath of data although FIG. 5 only shows eight rows 19-26. Based on the respective position of a pixel within the swath, it is determined whether an interior pixel should be maintained ON or turned OFF based on the position of the interior pixel within the checkerboard pattern 90. One purpose of the checkerboard pattern is that the interior pixels will be efficiently thinned so that no two ON interior pixels are adjacent to one another either for one row or for adjacent rows. For a large interior region, the entire internal region will be appropriately thinned to form a checkerboard pattern similar to that in FIG. 5. As one example, pixels 19B, 20A, 20C, 21B, 21D, 22A, 22C, 23B, 23D, 24A, 24C, 24E, 25B and 25D are thinned (as shown in FIG. 3D) based on the state of pixels 19B, 20A, 20C, 21B, 21D, 22A, 22C, 23B, 23D, 24A, 24C, 24E, 25B and 25D in the checkerboard pattern 90. In addition, pixels 11A, 13A, 15A, 16B, 18B, 19C, 22D, 23E and 25E are thinned in order to avoid having a state of two pixels ON in a row.

The printhead 34 is scanned across the image receiving medium 40 in step 108 to discharge 300 dpi ink droplets based on the thinned pixel image of FIG. 3D. It is understood that while FIG. 3D shows 300×600 dpi pixels, the ejected ink droplets are of a 300×300 dpi resolution. However, because the ink droplets are ejected based on a 300×600 grid timing, the time of firing of the ink drops is altered to produce a 300×600 effective resolution. Therefore, edge regions may have pixels from different rows offset from one another by a 600 dpi resolution. This is a result of the edge enhancement step 104 used to smooth the edges. For example, pixels 15B and 16C are offset in the raster scan direction by a 600 dpi resolution. Thus, the 300×300 dpi printhead effectively prints at a 300×600 dpi resolution.

In addition to the visually enhanced edge regions, interior regions of the pixel image are also visually enhanced because the thinning step 106 helps avoid excess ink from being deposited on the image receiving member 40. Furthermore, the printhead 34 does not have to print with the high frequency that would be required for a grid timing of a 600 dpi pixel.

Figure 4A:
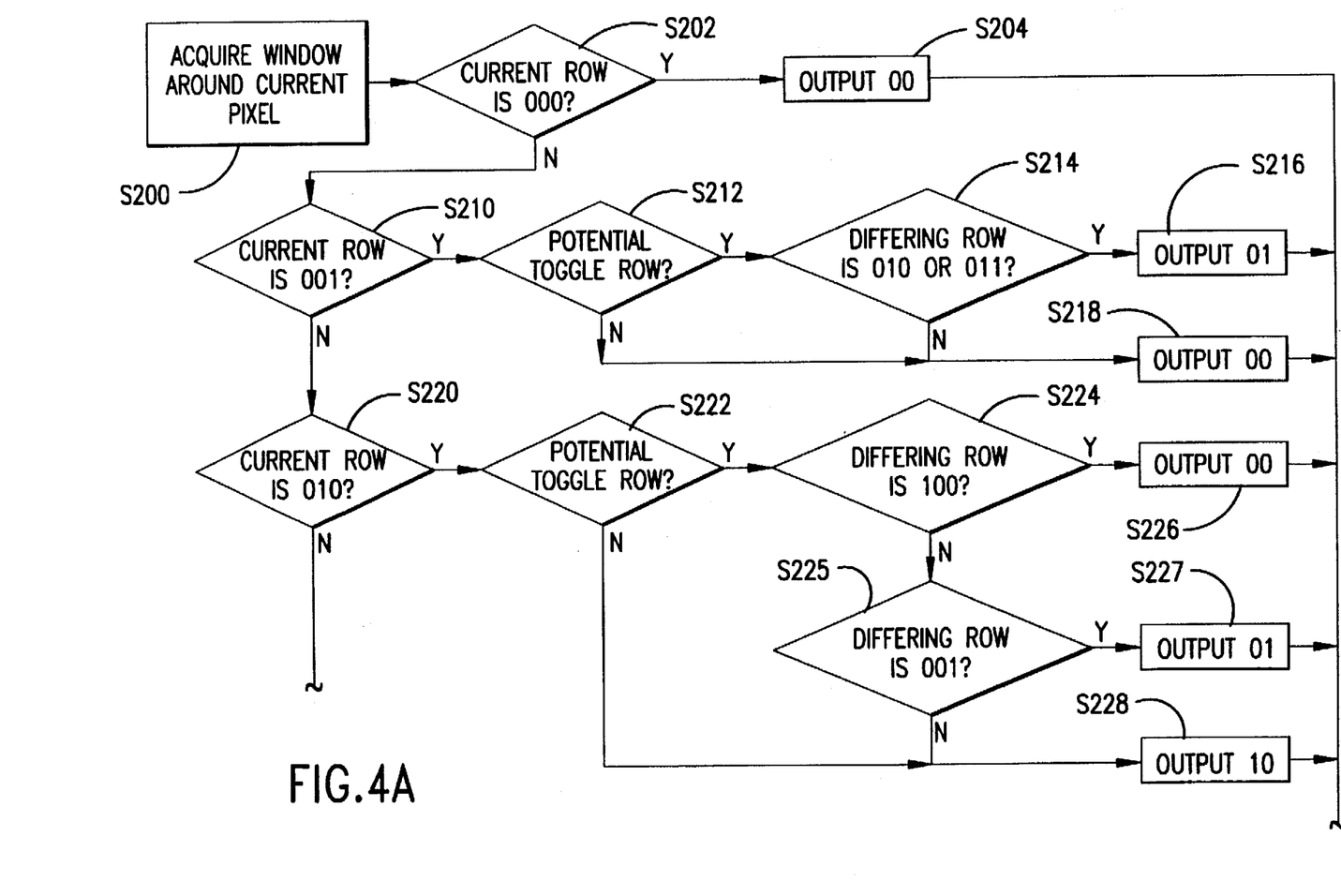
FIG. 4A, 4B, 4C and 4D show a flowchart of another embodiment of the present invention.
Figure 4B:
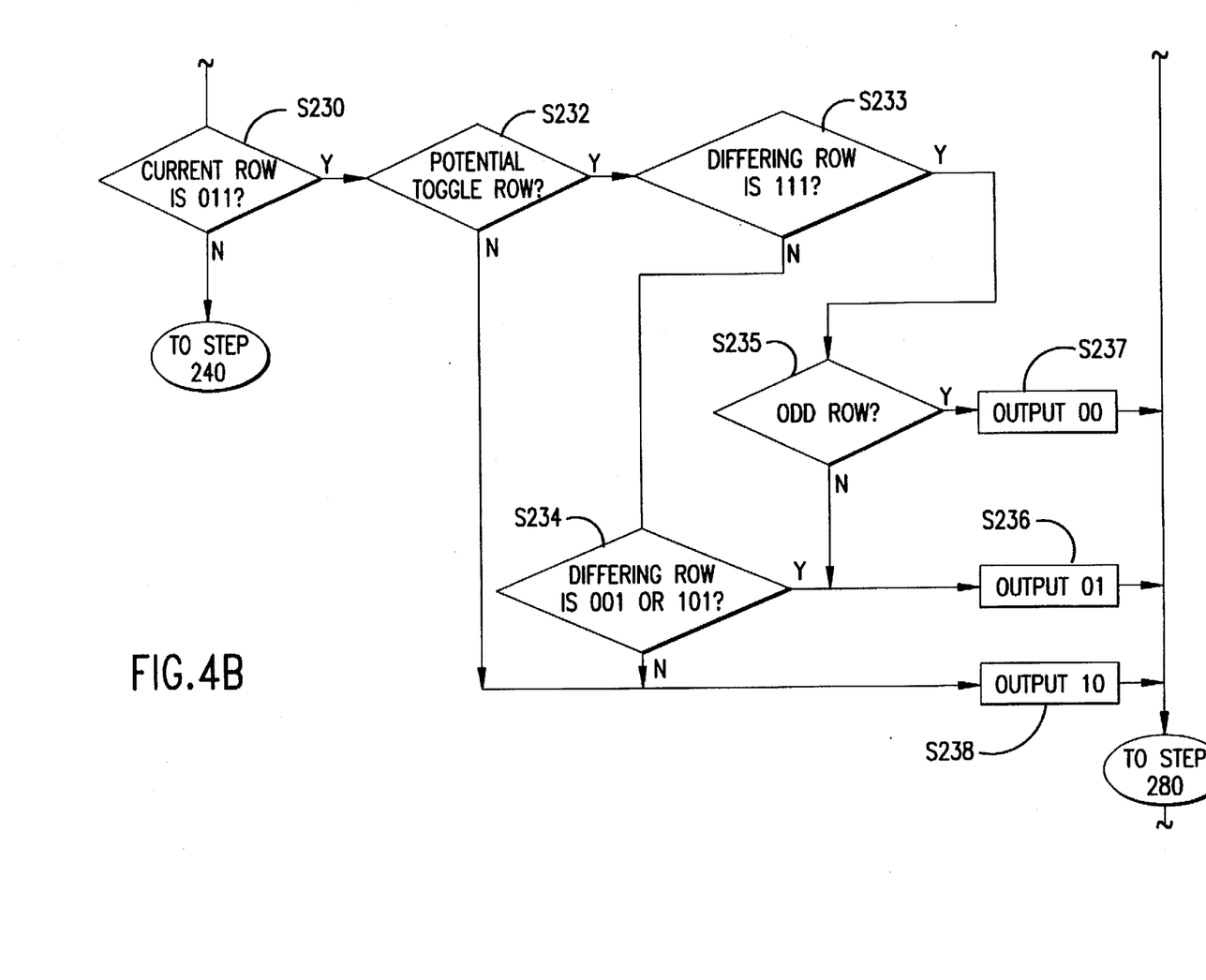
Figure 4C:
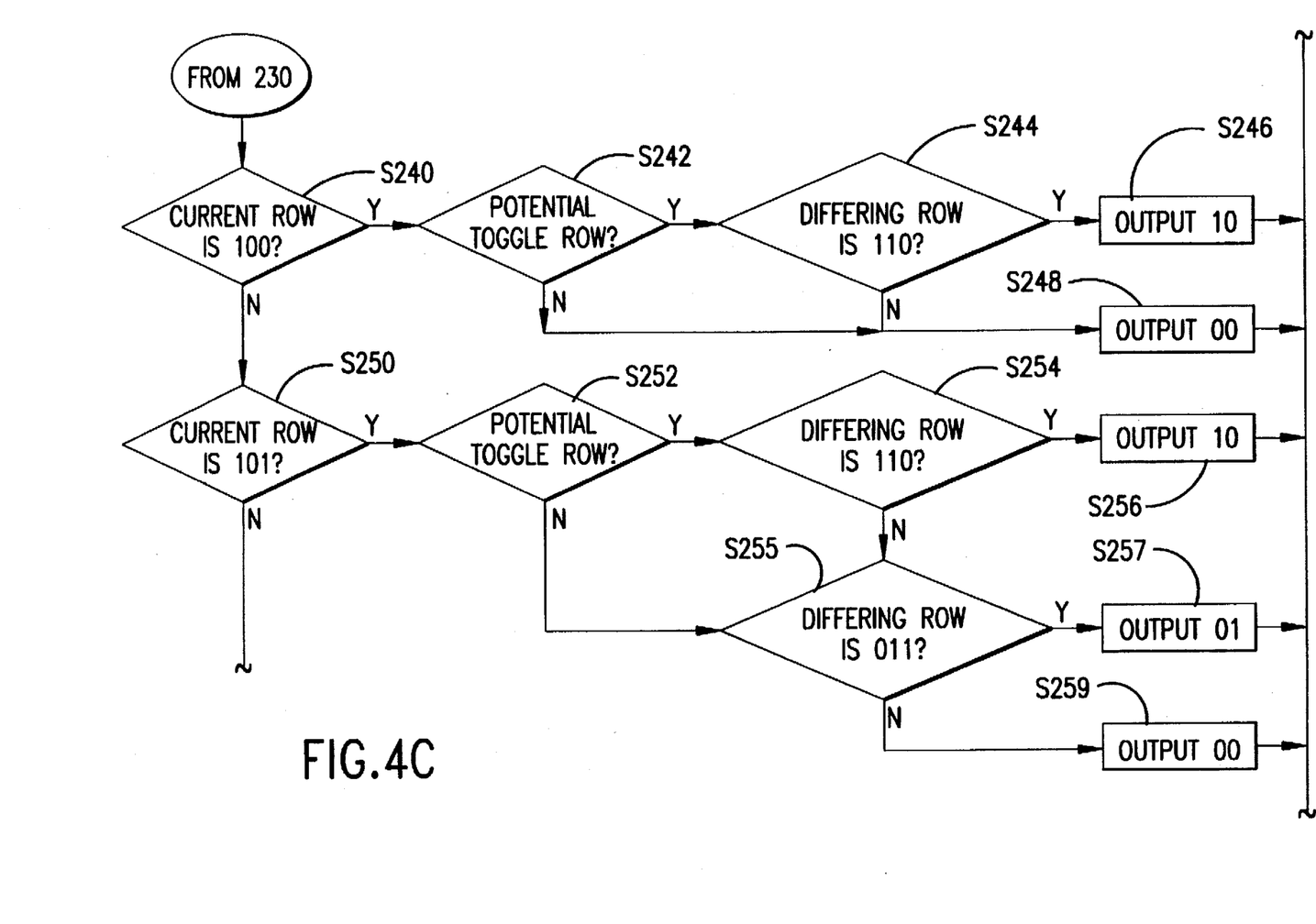
Figure 4D:
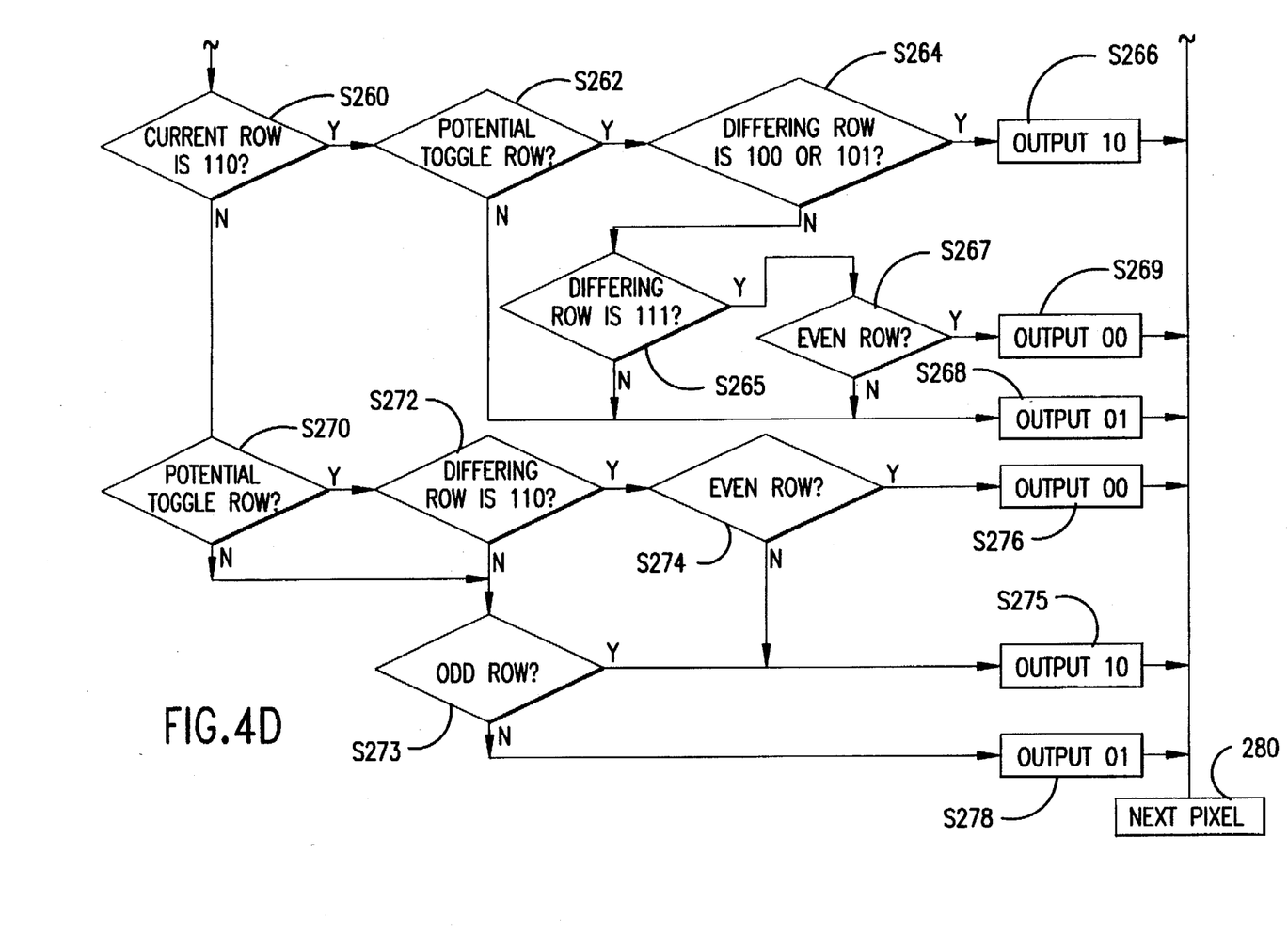

FIGS. 4A and 4B show a flowchart used in another embodiment where the edge enhancement step and the thinning step occur substantially simultaneously. Because the thinning and enhancement steps occur substantially simultaneously in this embodiment, the information used for determining the states of the output pixels is entirely contained in the low resolution input image (i.e., the 300×300 dpi pixel image). In this embodiment, each input pixel is replaced with two output pixels. A window of neighboring input pixels is used along with the input pixel to determine the states of the two output pixels corresponding to the input pixel. In this described embodiment, the window of neighboring pixels is three pixels wide (centered on the current pixel) and contains ten rows above the current row, twelve rows below the current row, and the current row. However, other embodiments of the window are also within the scope of this invention.

Processing is based on a case analysis of the possible contents of the pixels in the window. In other words, the output pixels are determined based on the pattern of pixels within the window. There are eight possible cases (or patterns) for a three pixel wide window, corresponding to the eight possibilities of the current row. Some of these cases have subcases, depending on the possible contents of previous or subsequent rows as will be described below. For ease of illustration, the cases (or patterns) are labelled in binary as 000 through 111 where a 0 indicates no ink in the input pixel (OFF), and 1 indicates ink for the pixel (ON). For example, 001 indicates the current pixel is white, the neighbor to the left is white, and the neighbor to the right is black.

One implementation of this embodiment will be described with respect to the flow chart of FIGS. 4A and 4B. It is understood that FIGS. 4A and 4B are merely illustrative and are not limiting. In step 200, a window is formed around the current pixel to be examined. As explained above, the window preferably is three pixels wide (centered on the current pixel) and contains ten rows above the current row, twelve rows below the current row and the current row. Decision steps 202, 210, 220, 230, 240, 250 and 260 are used to determine the states (pattern) of the current row. Based on the pattern of the current row, the current input pixel will be output as two output pixels in steps 204, 216, 218, 226, 227, 228, 236, 237, 238, 246, 248, 256, 257, 259, 266, 268, 269, 275, 276 and 278.

For example, in step 202 if the current row is 000 then the current pixel is in a region of white. In this case, the current pixel is output as two pixels 00 in step 204. The window is then appropriately moved in step 280 to a next pixel. In step 210, if the current row is 001 then the window is tested in step 212 to determine whether an edge transition occurs within the window by looking at the rows above and below the current row. This step 212 will be described below in greater detail. If no edge transition occurs in step 212, the current pixel is output as two pixels 00 in step 218. Otherwise, in step 214 it is determined whether the differing rows (corresponding to the edge transition) are 010 or 011. If the differing rows are a 010 or a 011 pattern, the current pixel is output as two pixels 01 in step 216. Otherwise, two pixels 00 are output in step 218 for the pixels corresponding to the current pixel. A next current pixel is similarly examined in step 280.

When the current row is a 010 pattern in step 220, step 222 determines whether an edge transition occurs. If no edge transition occurs within the window in step 222 then two pixels 10 are output for the current pixel in step 228. However, when an edge transition occurs as will be described below, the step 224 looks for a left edge transition (a 100 pattern) so that the current pixel is output as two pixels 00 in step 226. If there is a right edge transition the current pixel is output as two pixels 01 in step 227. While step 228 shows a 10 pixel pattern being output when no edge transition occurs, a 01 pixel pattern could also be output. Similarly, an alternating pattern of 01 and 10 could be used on successive scanlines.

Decision step 230 determines when a 011 pattern occurs for the current row of the window. Step 232 tests for an edge transition. When an edge transition occurs, the differing rows are examined in step 233. If the differing rows are a 111 pattern, and the row is odd, a 00 is output in step 237. If it is an even row, two pixels having a 01 pattern are output in step 236. If the differing rows are a 101 pattern or a 001 pattern, two pixels having a 01 pattern are output for the pixels corresponding to the current input pixel. If there is no transition, or it fails both of the above tests, the default 10 pattern is produced at step 238.

When the current row is a 100 pattern in step 240, then based on the steps 242 and 244, either a 10 pattern or a 00 pattern in step 248 is output for the two corresponding pixels. If decision step 250 determines that the current row is a 101 pattern then the current pixel can be output as two pixels having a 10 pattern in step 255, a 01 pattern in step 257 and a 00 pattern in step 258. Similarly, when the current row is a 110 pattern in step 260, then steps 262, 264, 265 and 267 are used to output two pixels having a 10 pattern in step 266, a 01 pattern in step 268 or a 00 pattern in step 269.

Finally, if processing results in a negative response in step 260, then the current row is a 111 pattern corresponding to an all black region. In this case, the pattern output for the two pixels corresponding to the current input pixel will correspond to a checkerboard pattern unless there is a transition as found in step 272. If the row is a even row in step 273, then two pixels having a 01 pattern is output in step 272. If the row is a odd row, then two pixels having a 10 pattern is output for the current pixel. That is, when an all black region occurs, the rows will be altered to form a checkerboard pattern among the respective rows. If step 272 indicates a transition and it is an even row, a 00 patern for the two pixels is generated in step 276; otherwise, if it is an odd row, a 10 pattern is output in step 275.

One embodiment to determine whether an edge transition occurs within the window will now be described. Accordingly, the following description can be used in steps 212, 222, 232, 242, 252, 262 and 270 of FIG. 4. For ease of illustration, the current scanline (or row) is numbered scanline i. Scanlines above scanline i are consecutively numbered i−1, i−2, i−3 etc. Scanlines below scanline i are consecutively numbered i+1, i+2, i+3 etc. Testing for edge transitions is accomplished by examining the respective scanlines with respect to the following eight cases.

1) if row i is identical to row i−1, and different from row i+1, row i is a potential toggle row.

2) if row i+1 is identical to rows i through i−4, and different from row i+2, row i is a potential toggle row.

3) if row i+2 is identical to rows i+1 through i−7, and different from row if 3, row i is a potential toggle row.

4) if row i+3 is identical to rows i+2 through i−10, and different from row i+4, row i is a potential toggle row.

5) if row i−1 is different from row i, and rows i through i+3 are identical, row i is a potential toggle row.

6) if row i−2 is different from row i−1, and rows i−1 through i+6 are identical, row i is a potential toggle row.

7) if row i−3 is different from row i−2, and rows i−2 through i+9 are identical, row i is a potential toggle row.

8) if row i−4 is different from row i−3, and rows i−3 through
i+12 are identical, row i is a potential toggle row. Now if the current row is not a potential toggle row, there is no edge transition. By using the above eight tests, it is determined whether the current row is a potential toggle row. Based on this decision in steps 212, 222, 232, 242, 252 and 262, the subsequent processing can continue in a manner as described above with respect to FIG. 4. Other methods of determining potential toggle rows are also within the scope of this invention.

Accordingly, FIG. 4 shows a method where the edge enhancement and the thinning step occur simultaneously. This can be done by matching patterns or other embodiments as is known in the art. Furthermore, it can be appreciated that the above embodiments can also increase the number of pixels, enhance the edges and thin the pixels all simultaneously. For example, a three pixel wide window may be provided to convert three pixels into four pixels based on the pattern of the three pixels. If an interior region (BBB) is encountered then the pixels may be appropriately thinned as a BWBW pattern or a WBWB pattern depending on whether the row is an odd pixel row or an even pixel row. If an edge region is encountered, then the pixels may be altered to enhance the edge and also perform thinning. By using a three pixel wide window, the steps of increasing the resolution, enhancing the edges and thinning the image may occur simultaneously as described with respect to FIG. 4 in one embodiment. However, the above-described method is described in steps to be more illustrative.

While the invention has been described in relation to preferred embodiments, many modifications and variations are apparent from the description of the invention. All such modification and variations are intended to be within the scope of the present invention as defined in the appended claims.

What is claimed is:

1. A resolution enhancement method for printing a pixel image using an ink jet printer having a defined resolution along a raster scan axis, the method comprising the steps of:

receiving the pixel image having the defined resolution along the raster scan axis including adding pixels along edges based on information contained in an adjacent scanline;

increasing a resolution of the pixel image along the raster scan axis;

thinning the pixel image; and raster scanning the thinned pixel image with the ink jet printer to visibly reproduce the pixel image at the increased resolution.

2. The method of claim 1, wherein the resolution increasing step and the thinning step occur substantially simultaneously.

3. The method of claim 1, wherein the defined resolution is approximately 300 dots per inch along the raster scan axis.

4. The method of claim 1, wherein the increased resolution is approximately 600 dots per inch along the raster scan axis.

5. The method of claim 1, wherein the resolution increasing step comprises the step of doubling a number of pixels in the pixel image.

6. The method of claim 5, wherein the resolution increasing step adds pixels along an edge of the pixel image after doubling the number of pixels in the pixel image.

7. The method of claim 5, wherein the resolution increasing step further deletes pixels along an edge of the pixel image after doubling the number of pixels in the pixel image.

8. The method of claim 1, wherein the thinning step maintains edges of the pixel image.

9. The method of claim 1, wherein the thinning step comprises turning OFF interior pixels from the pixel image having the increased resolution.

10. The method of claim 9, wherein selected ones of the interior pixels are turned OFF during the thinning step based on a checkerboard pattern.

11. The method of claim 1, wherein the resolution increasing step increases a grid timing of the ink jet printer.

12. The method of claim 11, wherein the raster scanning step fires ink drops corresponding to the increased grid timing to visibly reproduce the pixel image at the increased resolution.

13. The method of claim 1, wherein the resolution increasing step comprises increasing a number of pixels in the pixel image.

14. The method of claim 13, wherein the resolution increasing step adds pixels along an edge of the pixel image.

15. The method of claim 13, wherein the increased resolution step further includes turning OFF pixels along an edge of the pixel image.

16. A resolution enhancement method for printing a pixel image using an ink jet printer having a defined resolution along a raster scan axis, the pixel image comprising a plurality of pixel rows each extending along the raster scan axis and a plurality of pixel columns each extending along a direction perpendicular to the raster scan axis, the method comprising the steps of:

receiving the pixel image having the defined resolution along the raster scan axis;

producing an altered pixel image having a resolution along the raster scan axis greater than the defined resolution;

turning OFF pixels in the altered pixel image, the thinned altered pixel image including added pixels along edges based on information contained in an adjacent scanline; and printing remaining pixels from the altered pixel image using the ink jet printer having the defined resolution to visibly reproduce the pixel image at the resolution along the raster scan axis greater than the defined resolution.

17. The method of claim 16, wherein the producing step comprises the step of reproducing each pixel column of the pixel image to form the altered pixel image.

18. The method of claim 16, wherein the producing step includes altering selected pixel columns along an edge of the pixel image.

19. The method of claim 18, wherein the selected pixel columns are altered by adding ON pixels to the selected pixel columns.

20. The method of claim 18, wherein the selected pixels are altered by turning OFF pixels in the selected pixel columns.

21. The method of claim 16, wherein pixels are added along an edge of the altered pixel image after the producing step.

22. The method of claim 16, further comprising the step of turning OFF pixels along an edge of the altered pixel image.

23. The method of claim 16, wherein the turned OFF pixels are interior pixels.

24. The method of claim 23, wherein the interior pixels are turned OFF based on a checkerboard pattern.

25. The method of claim 16, wherein the ink jet printer prints the remaining pixels based on an increased grid timing of the ink jet printer along the raster scan axis.

26. A resolution enhancement method for printing a pixel image using an ink jet printer having a defined resolution along a raster scan axis, the method comprising the steps of:

receiving the pixel image having the defined resolution, the pixel image comprising a plurality of ON pixels;

increasing a number of ON pixels in the received pixel image including adding pixels along edges based on information contained in an adjacent scanline to form an altered pixel image, each one of the increased number of ON pixels having a greater resolution along the raster scan axis than the defined resolution;

thinning the altered pixel image; and firing ink drops from the ink jet printer at areas corresponding to remaining ON pixels of the thinned altered pixel image to visibly reproduce the pixel image at the greater resolution along the raster scan axis.

27. A resolution enhancement method for printing a pixel image using an ink jet printer having a defined resolution along a raster scan axis, the method comprising the steps of:

receiving the pixel image having the defined resolution, the pixel image comprising a plurality of pixels;

producing an altered pixel image from the received pixel image, the altered pixel image having an increased resolution along the raster scan axis, selected ones of pixels within the altered pixel image being turned OFF, the altered pixel image including added pixels along edges based on information contained in an adjacent scanline; and raster scanning the altered pixel image with the ink jet printer to visibly reproduce the pixel image at the increased resolution.

28. The method of claim 27, further comprising the steps of:

examining a set of pixels;

comparing the set of pixels with a plurality of standard patterns; and altering the set of pixels based on a pattern from the plurality of standard patterns matching the set of pixels.

29. The method of claim 28, wherein the altered set of pixels includes at least one additional pixel than a number of pixels within the set of pixel.

* * * * *